US012650730B1

(12) United States Patent
Sipolins et al.

(10) Patent No.: US 12,650,730 B1
(45) Date of Patent: Jun. 9, 2026

(54) SYSTEMS AND METHODS FOR CONTENT MODIFICATION BASED ON EYE TRACKING DATA

(71) Applicant: Adeia Guides Inc., San Jose, CA (US)

(72) Inventors: Aldis Sipolins, Somerville, MA (US);
Dhananjay Lal, Englewood, CO (US);
Mareeta Mathai, San Jose, CA (US);
Cato Yang, San Jose, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/970,551

(22) Filed: Dec. 5, 2024

(51) Int. Cl.
*G06F 3/01* (2006.01)
*G06T 11/60* (2006.01)

(52) U.S. Cl.
CPC .............. *G06F 3/013* (2013.01); *G06T 11/60* (2013.01)

(58) Field of Classification Search
CPC ................................. G06F 3/013; G06T 11/60
See application file for complete search history.

(56) References Cited

U.S. PATENT DOCUMENTS

| | | | |
|---|---|---|---|
| 9,857,871 B2 | 1/2018 | Mallinson | |
| 2018/0286070 A1 * | 10/2018 | Benedetto | ................. G06T 7/62 |
| 2019/0012824 A1 | 1/2019 | Sun et al. | |
| 2019/0346922 A1 | 11/2019 | Young et al. | |
| 2019/0354174 A1 * | 11/2019 | Young | ..................... G09G 5/391 |
| 2021/0132415 A1 * | 5/2021 | Bhat | ........................ G02C 7/04 |

FOREIGN PATENT DOCUMENTS

| | | | | |
|---|---|---|---|---|
| WO | WO-2014061017 A1 * | 4/2014 | ......... | G06F 3/04812 |
| WO | WO-2017025487 A1 * | 2/2017 | ............. | G06F 3/013 |

OTHER PUBLICATIONS

Arabadzhiyska, E., et al., "Practical Saccade Prediction for Head-Mounted Displays: Towards a Comprehensive Model", ACM Transactions on Applied Perceptions, vol. 20, No. 1, Jan. 11, 2023, 23 pages.

Baloh, R. W., et al., "Quantitative measurement of saccade amplitude, duration, and velocity", Neurology, vol. 25, No. 11, Nov. 1975, pp. 1065-1070 (Abstract only).

Crevecoeur, F., et al., "Saccadic suppression as a perceptual consequence of efficient sensorimotor estimation", eLife, May 2, 2017, 15 pages.

Feng, J., et al., "Attending to large dynamic displays", Extended Abstracts Proceedings of the 2008 Conference on Human Factors in Computing Systems, Apr. 5, 2008, pp. 2745-2750.

(Continued)

*Primary Examiner* — Stephen G Sherman
(74) *Attorney, Agent, or Firm* — HG LAW LLP

(57) ABSTRACT

Systems and methods are disclosed for modifying content items based on eye tracking data, which may be indicative of saccadic suppression of a user. A plurality of content items is displayed on a device, including a first content item displayed at a first region. In an example, based on eye tracking data of the user, the onset of a saccade of the user is detected. An end location and duration of the saccade may be predicted based at least in part on the eye tracking data. A saccadic suppression window is identified based on the predicted duration. Based at least in part on the predicted end location, the display of the first content item is modified at a time that is within the saccadic suppression window.

20 Claims, 8 Drawing Sheets

(56)                References Cited

OTHER PUBLICATIONS

Google Ads Help, "About topic targeting", available online at: <https://support.google.com/google-ads/answer/2497832?hl=en#:~:text= Topic%20targeting%20allows%20your%20ads,appear%20can% 20change%20with%20it.>, retrieved on Feb. 5, 2025, 2 pages.

Guadron, L., et al., "Speed-accuracy tradeoffs influence the main sequence of saccadic eye movements", Nature, vol. 12, Mar. 28, 2022, 14 pages.

Matin, E., "Saccadic suppression: A review and an analysis.", Psychological Bulletin, vol. 81, No. 12, 1974, pp. 899-917.

Morales, A., et al., "Saccade Landing Point Prediction Based on Fine-Grained Learning Method", IEEE Access, vol. 9, Apr. 1, 2021, pp. 52474-52484.

Real Eye, "Behavioral Research in Advertising", Available online at: <https://www.realeye.io/use-cases/use-cases-testing-advertisements>, Retrieved on Feb. 5, 2025, pp. 1-7.

Sing, A., "Image Similarity for Brand Detection: A Comparison Between BEiT, SWIN and ViT-MAE", Bolster, available online <https://bolster.ai/blog/image-similarity-beit-swin-vit-mae>, Feb. 22, 2024, 22 pages.

Sun, Q., et al., "Towards virtual reality infinite walking: dynamic saccadic redirection", ACM Transactions on Graphics, vol. 37, No. 4, Jul. 30, 2018, pp. 1-13.

Valliappan, N, et al., "Accelerating eye movement reasearch via accurate and affordable smartphone eye tracking", Nature Communications, vol. 11, Article No., 4553, Sep. 11, 2020, pp. 1-12.

Wierts, R., et al., "Measuring Saccade Peak Velocity Using a Low-Frequency Sampling Rate of 50 Hz", IEEE Transactions on Biomedical Engineering, vol. 55, No. 12, Dec. 2008, pp. 2840-2842.

* cited by examiner

User Input
Interface Circuitry

Display
Circuitry

414

418

410

412

408

406

404

402

416

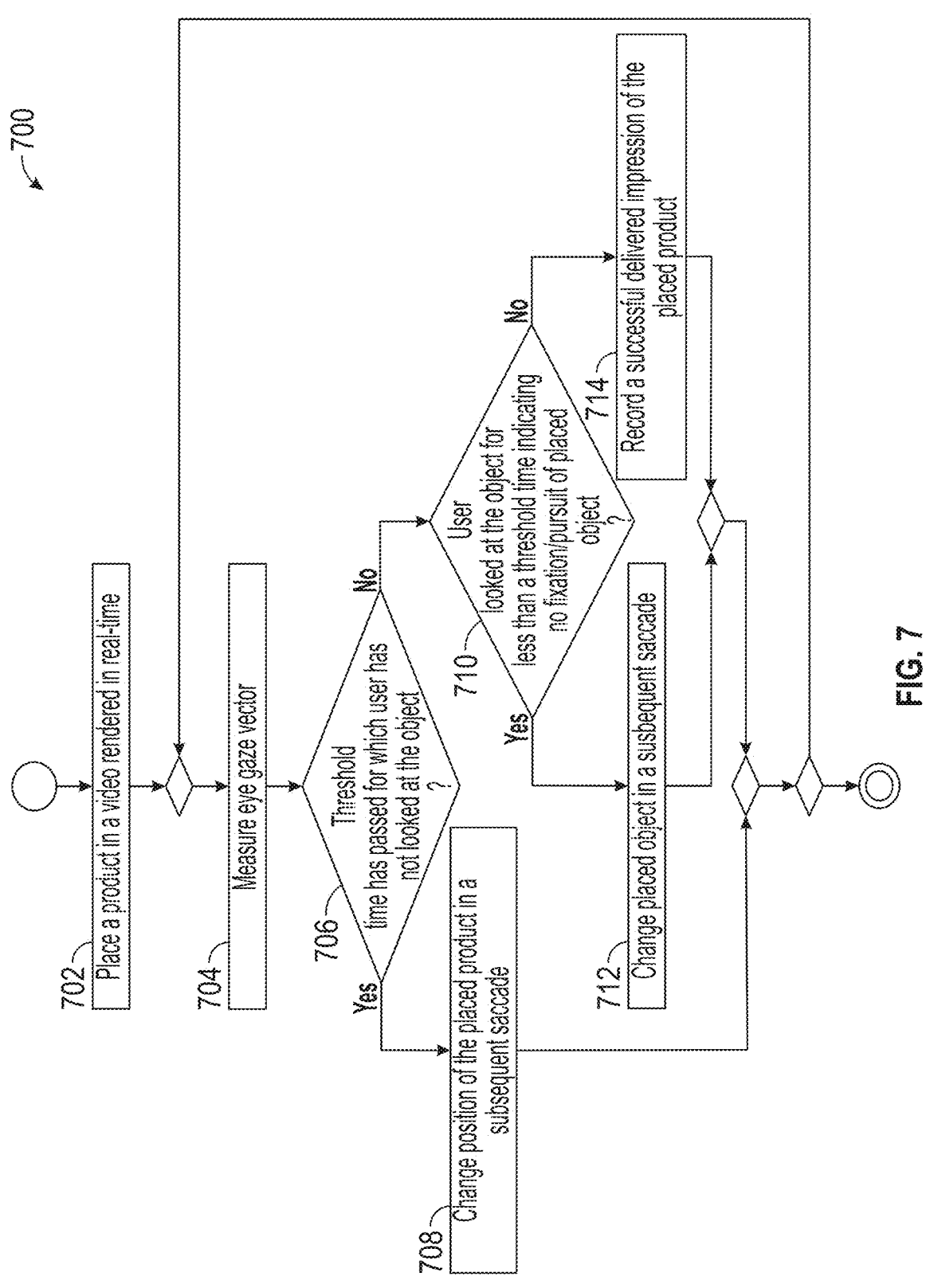

700

702 Place a product in a video rendered in real-time

704 Measure eye gaze vector

706 Threshold time has passed for which user has not looked at the object ?

Yes

708 Change position of the placed product in a subsequent saccade

No

710 User looked at the object for less than a threshold time indicating no fixation/pursuit of placed object ?

Yes

712 Change placed object in a susbequent saccade

No

714 Record a successful delivered impression of the placed product

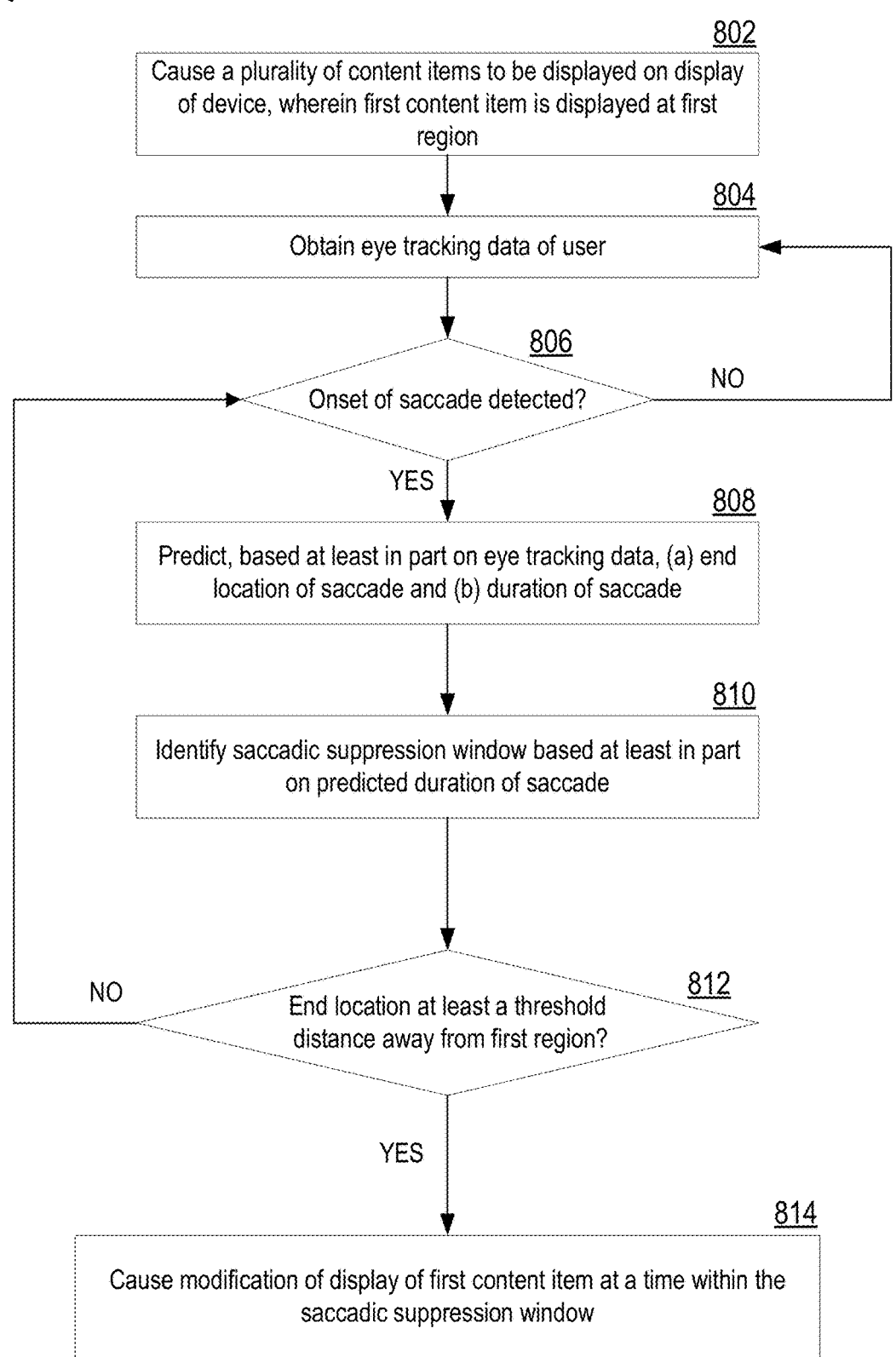

<u>802</u>
Cause a plurality of content items to be displayed on display of device, wherein first content item is displayed at first region <u>804</u>
Obtain eye tracking data of user <u>806</u>
Onset of saccade detected?

NO

YES

<u>808</u>
Predict, based at least in part on eye tracking data, (a) end location of saccade and (b) duration of saccade <u>810</u>
Identify saccadic suppression window based at least in part on predicted duration of saccade <u>812</u>
End location at least a threshold distance away from first region?

NO

YES

<u>814</u>
Cause modification of display of first content item at a time within the saccadic suppression window

FIG. 8

SYSTEMS AND METHODS FOR CONTENT MODIFICATION BASED ON EYE TRACKING DATA

BACKGROUND

This disclosure relates to modifying displayed content based on eye tracking data of a user viewing content, and more particularly, the eye tracking data may be indicative of saccadic suppression or other aspect of user consumption or engagement with the displayed content.

SUMMARY

When providing content to a user, it can be useful to present the content via a user interface (UI) that is both meaningful to and engaging for the user, particularly when the amount of content that can be displayed is limited by the screen space of the display. It would also be useful to, if the UI is to be modified, modify the UI in a manner that is least distracting or obstructive to the user (e.g., without requiring the user to navigate to and load another page, or without modifying a portion of the UI that a user is currently focused on, in certain scenarios). It would also be useful to accurately predict when and where the user may look when modifying the UI.

In one approach, the content provider may track user behavior (such as via cookies) to identify and present personalized content to the user. However, such personalized content generally is presented in a manner (such as a placement on the screen, and at a time) that fails to take into account visual properties of content already present on the screen and visual properties of the personalized content to be presented on the screen, and also fails to take into account at what or where the user is looking when the personalized content is presented. Such presentation can be disruptive or jarring to the user, which in turn can disrupt user engagement with the UI, or can result in the user failing to notice the personalized content. This results in a less effective UI for improving user engagement and effective consumption of the content, as well as an inefficient use of computing resources to identify personalized content that is unlikely to be well-received by the user or that is unlikely to be noticed by the user. Therefore, improved methods for changing the UI in a minimally perceptible or less disruptive manner are desired. To achieve this, it would be helpful to make content changes or introduce content via the UI based on eye tracking data of the user.

When visually perceiving the environment, humans can voluntarily shift gaze in one of two ways: saccades and smooth pursuit. A saccade is a quick, simultaneous movement of both eyes toward a new fixation point. In contrast, smooth pursuit involves eye movement where the eyes remain fixated on a moving object. Because humans are unable to smoothly move their eyes unless they are following a moving target (e.g., smooth pursuit), they rely on saccades to examine the environment, interpret facial expressions, read, or perform any other activity relying on vision. On average, a person makes 2-3 saccadic eye movements every second. These saccadic eye movements are typically followed by a brief period of fixation as the brain processes the new visual information. There are two types of saccades: voluntary and involuntary. Voluntary saccades may be driven by user features such as intent or motivation. Involuntary saccades may be driven by visual features of the target, such as the appearance of new stimuli. The distance traveled by a single saccade is referred to as its amplitude and is defined in terms of visual angle. A single saccade can cover up to 40° of visual angle. Saccade duration depends on amplitude (e.g., larger saccades correspond with longer duration). A saccade takes roughly 2.7 ms per degree of visual field traveled and most saccades take 20-40 ms.

Saccadic suppression (also referred to as saccadic masking) selectively blocks visual processing during saccades so that the motion of the eye, the motion blur of the image, and the gap in visual perception are generally undetectable or imperceptible by the viewer. Because humans are unable to notice saccadic suppression, they are blind to visual changes that occur during a saccade. Saccadic suppression can precede the onset of a saccade by 40 ms and can last up to 80 ms after it ends. Therefore, an average saccade duration of 20-40 ms can result in a 140-160 ms saccadic suppression window.

In one approach, the disruptive or jarring nature from presenting certain content (e.g., warnings to the user, such as notifications that they are approaching the edge of a safe, tracked space) may be reduced by altering the user's perspective of the content (e.g., tilting the perspective toward the center of a tracked space in a VR environment) during saccadic suppression of the user. However, such approach is limited to the same or otherwise unchanging content, which the user is already familiar with, so changes in the perspective of the same content would not cause as much disruption to user engagement with the UI. Thus, such approach does not address the perceptible disruption that can result when the content needs to be changed to different or modified content.

In another approach, the graphics of the display device may be adjusted (e.g., to render the same content but in lower resolution) during saccadic suppression. However, such approach is also limited to unchanging content, and does not address the perceptible disruption resulting from changing the content to a different or modified content.

To help address these problems, systems and methods are provided herein for improved techniques for analyzing cognitive and perceptual processing of displayed digital content, and responsively modifying the displayed content to enhance the consumption of an otherwise limited amount of displayed content. Techniques for analyzing cognitive and perceptual processing include processing light sensor data to perform real-time eye tracking, and to quantify and track engagement and perception of particular portions of the displayed content. The modification of the displayed content may be based on the analysis of the cognitive and perceptual processing of the displayed content (e.g., level of user engagement with the displayed content). For example, the described techniques may identify a particular portion of the content that may be modified or replaced, may determine an appropriate timing to modify the particular portion of the content, may identify a specific modification to be made, and if certain parameters are satisfied, may perform the specific modification to the particular portion of the content within the particular timing (e.g., within the saccadic suppression window). Techniques for modifying the displayed content may also include processing the light sensor data to identify and quantify saccadic eye movements, and more particularly, to determine or predict a duration, path, and/or end location of a saccadic suppression window. The timing and identification of the specific modification to be made to the displayed content may be based, for instance, on characteristics of presently displayed content and of the saccadic eye movement/saccadic suppression window. The disclosed techniques further include coordinating with content servers or storage devices to pre-fetch replacement or modified content, which further helps to modify the displayed content seamlessly and in real time.

In some embodiments, a saccadic detection application (SDA) is provided for analyzing the cognitive and perceptual processing of a user of displayed digital content and responsively modifying the displayed content based on a saccade of the user. In some embodiments, the SDA causes a plurality of content items to be displayed on a display of a device. A first content item of the plurality of content items may be displayed at a first region on the display of the device. The SDA may obtain eye tracking data of a user. The SDA may determine, based at least in part on the eye tracking data, an onset of a saccade of the user. The SDA may predict a duration of the saccade and identify a saccadic suppression window based at least in part on the predicted duration of the saccade. The SDA may cause modification of the display of the first content item at a time that is within the saccadic suppression window. In some embodiments, the SDA predicts an end location, on the display, of the saccade. The SDA may cause modification of the display of the first content item at a time that is within the saccadic suppression window further based at least in part on the predicted end location.

In some embodiments, the modification of the display of the first content item comprises causing the first content item at the first region of the display to be replaced with a second content item.

In some embodiments, the SDA selects the second content item for display based on at least one of: visual or semantic features of the first content item, visual or semantic features of the second content item, or visual or semantic features of another content item from the plurality of content items that has remains unmodified.

In some embodiments, the SDA selects the second content item from the plurality of content items based at least in part on the predicted duration of the saccade./

In some embodiments, a third content item of the plurality of content items displayed at a second region on the display of the device remains unmodified when the first content item is replaced with the second content item at the first region of the display.

In some embodiments, the modification of the display of the first content item comprises at least one of: changing a background of the first content item, changing text of the first content item, replacing a visual component within the first content item with another visual component, changing an arrangement of the visual component within the first content item, or changing a visual feature of the visual component within the first content item.

In some embodiments, the modification of the display of the first content item comprises at least one of: a gradual modification of the display of the first content item over a period of time, an abrupt or singular modification of the display of the first content item, or a modification of the display of the first content item over a duration of a plurality of saccades.

In some embodiments, the end location is predicted based on at least one of: (a) a respective saliency score of each of the plurality of content items displayed on the display of the device or (b) the eye tracking data.

In some embodiments, predicting the end location based on the eye tracking data is performed at a time during the saccade. The prediction may be further based on: determining, based on the eye tracking data, a peak velocity of the saccade; and determining, based on the eye tracking data, a direction of the saccade.

In some embodiments, predicting the end location based on the respective saliency score of each of the plurality of content items is performed at a time prior to the onset of the saccade and prior to obtaining the eye tracking data. The prediction may be further based on: calculating, for each of the plurality of content items, the respective saliency score, wherein the plurality of content items correspond to a plurality of respective regions on the display of the device; identifying a content item of the plurality of content items with the highest or relatively high saliency score or with a saliency score above a threshold; and determining as the predicted end location a location within a region corresponding to the identified content item.

In some embodiments, the respective saliency score of each content item of the plurality of content items on the display of the device is calculated based at least in part on at least one of: a visual saliency score or a semantic saliency score of the corresponding content item.

In some embodiments, the content item from the plurality of content items comprises a background of a region.

In some embodiments, predicting the duration of the saccade is further based on: determining an amount of time remaining in the saccade, based at least in part on a peak velocity of the saccade; and determining a distance remaining in the saccade, based at least in part on a distance between a current location of the saccade and the predicted end location of the saccade.

In some embodiments, the SDA modifies the first content item further based at least in part on: determining a user engagement level in relation to the first content item; and determining that the user engagement level in relation to the first content item is below a threshold level of user engagement.

In some embodiments, the SDA determines the user engagement level is based on at least one: a length of time that user gaze is directed at the first content item, a number of times the user gaze is directed at the first content item, or a number of saccades of the user within a certain distance of the first region.

In some embodiments, the SDA modifies the first content item is further based at least in part on: determining a user engagement level in relation to the first content item; and determining that the user engagement level in relation to the first content item is above a threshold level of user engagement.

In some embodiments, the SDA predicts the end location further based at least in part on a predicted layout scanning pattern associated with the plurality of content items as displayed on the display of the device.

In some embodiments, the SDA causes modification of the display of the first content item at a time that is within the saccadic suppression window, further based at least in part on determining that the predicted end location is located at least a threshold distance away from the first region.

In some embodiments, each of the plurality of content items is associated with a respective plurality of default values corresponding to visual or semantic attributes of the respective content item. The SDA may calculate a saliency score of the first content item as displayed at a first time and determine that the saliency score is below a threshold. The SDA may cause modification of the display of the first content item further based at least in part on determining that the saliency score is below a threshold.

A benefit of the described systems and methods includes improving the functioning of computers and computer networks in analyzing cognitive and perceptual processing of displayed digital content, and responsively modifying the displayed content to enhance the consumption of an otherwise limited amount of displayed content. For example, the SDA may infer a user's semantic and visual processing of displayed content based on the user's eye movement. The SDA may optimize the use of limited screen space of a display device (or field of view, such as with a 3D display device) by selecting and presenting content based on how the user processes semantic and visual elements of displayed content.

Another benefit includes reducing inefficient use of processing power to perform unnecessary actions that disrupt user engagement (e.g., changing the UI by loading a new page) by providing an improved UI that changes dynamically in a minimally perceptible manner. For example, the modification of displayed content may be performed to display new content (or information) in a manner that is perceptually seamless to help avoid distraction from the consumption of other displayed content.

Another benefit includes a technical advantage of improving accuracy of predicting an end location of a saccade by refining a pre-saccade prediction of the end location with a live saccade prediction of the location. A more accurate prediction of the saccade end location also reduces inefficient use of computing resources otherwise needed to recompute and correct inaccuracies in the prediction.

Yet another benefit includes improving performance of sensors or other suitable hardware by dynamically adjusting the number of eye tracking samples to compensate for lower quality hardware while maintaining high accuracy of saccadic predictions.

BRIEF DESCRIPTION OF THE FIGURES

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIGS. 1A, 1B, and 1C show an example scenario of modifying displayed content based on a saccade of a user, in accordance with an embodiment of the disclosure;

FIGS. 2A and 2B show an example scenario of continuing to display unmodified content based on a saccade of a user, in accordance with an embodiment of the disclosure;

FIG. 3 shows an example timeline of a saccade, in accordance with an embodiment of the disclosure;

FIG. 7 is a flowchart of an example process for modifying an object featured within displayed content based on a saccade of a user, in accordance with an embodiment of the disclosure; and FIG. 8 is a flowchart of another example process for modifying displayed content based on a saccade of a user, in accordance with an embodiment of the disclosure.

DETAILED DESCRIPTION

Figures 1A, 1B:
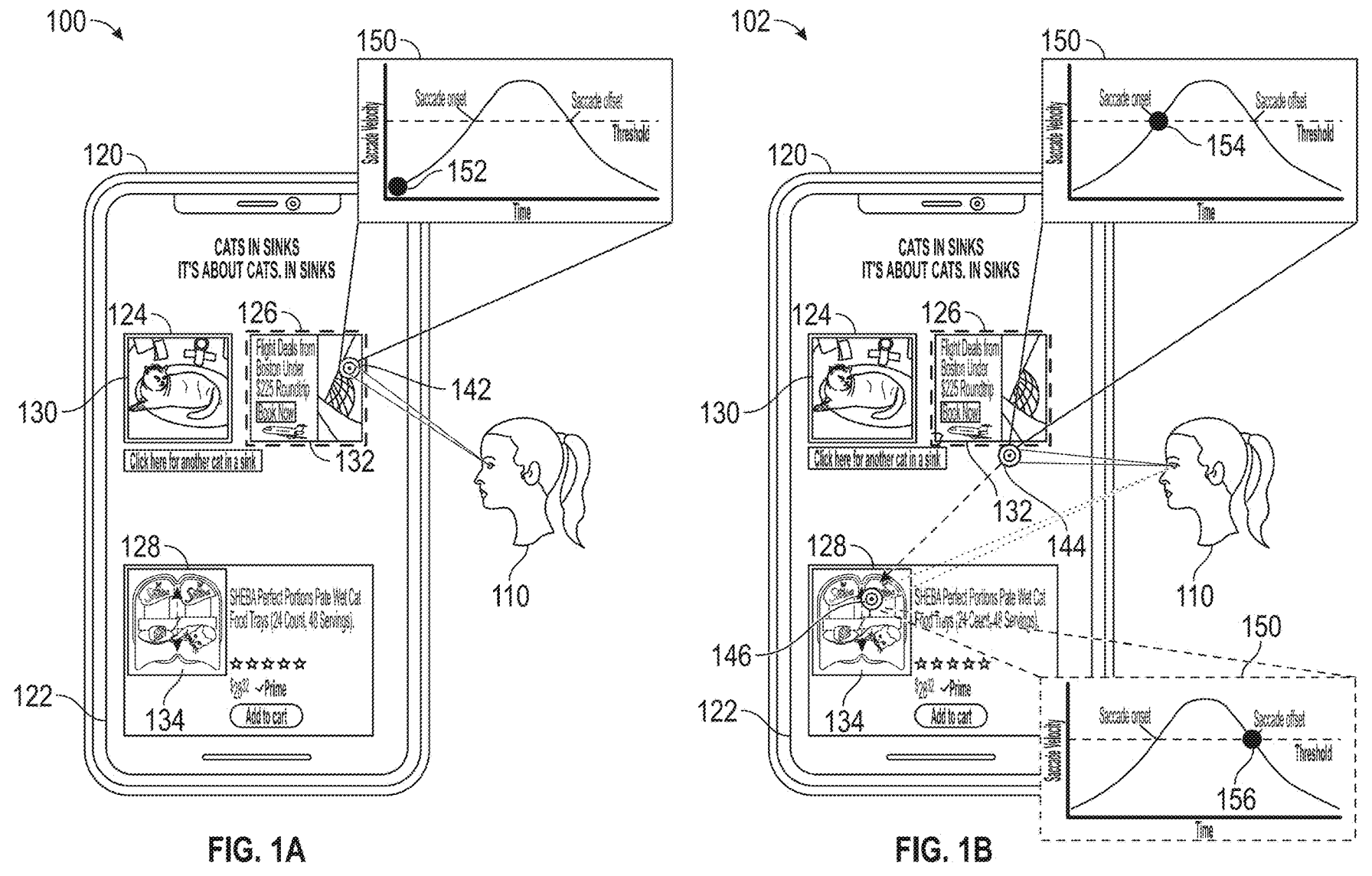
Figures 1C, 2A:
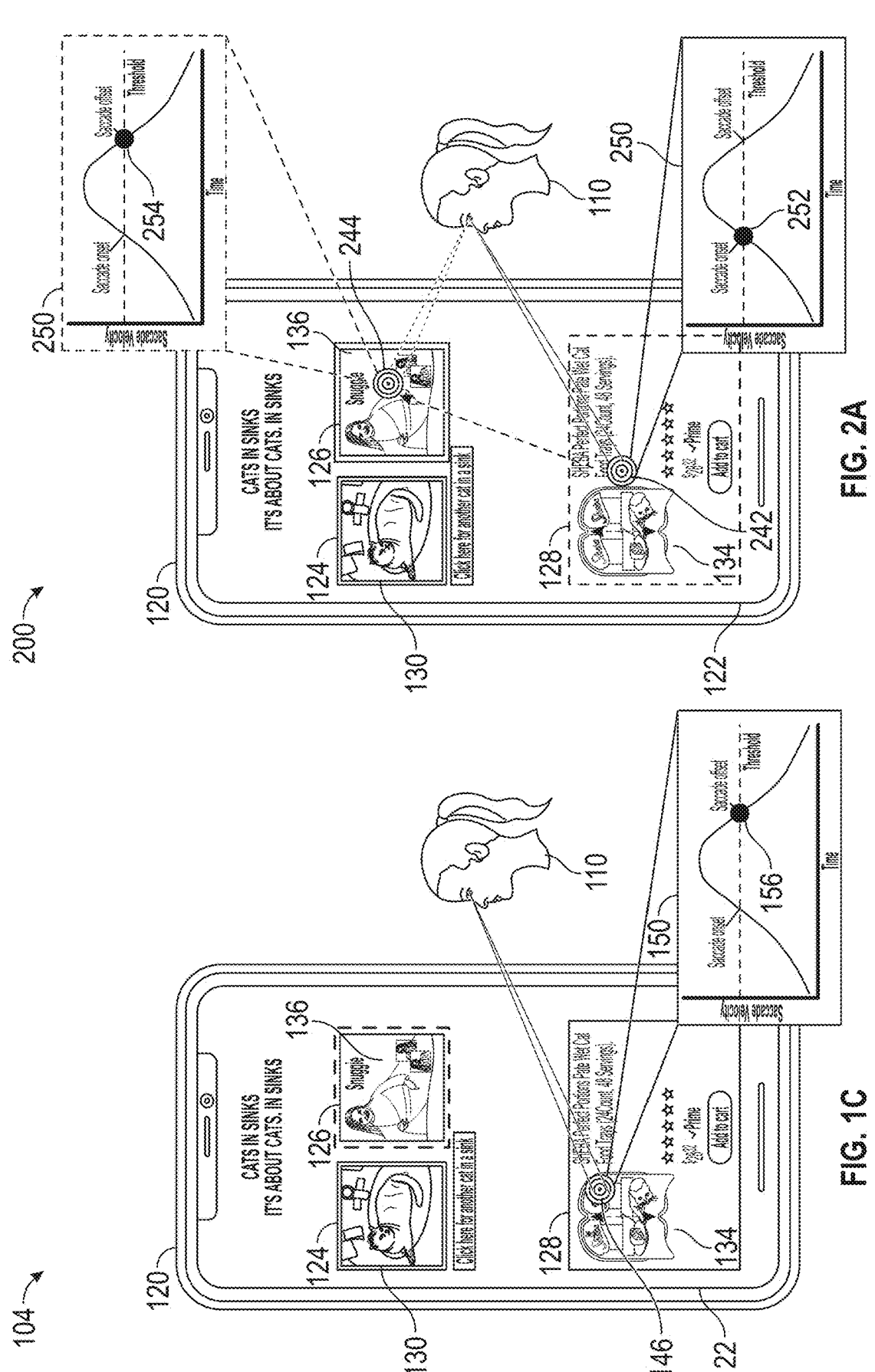

FIGS. 1A, 1B, and 1C show an example scenario 100, 102, and 104, respectively, of modifying displayed content based on a saccade of a user, in accordance with an embodiment of the disclosure. In some embodiments, a saccadic detection application (SDA) is configured to perform the functionalities (or any suitable portion of the functionalities) described herein. For instance, in example 100 of FIG. 1A, the SDA may display (or cause display of) content on the display 122 of user device 120, including content item 132 at a screen space region 126 on display 122. In example 102 of FIG. 1B, the SDA may detect (e.g., based on eye tracking data) the onset of a saccade 150 of user 110 viewing one or more content items on display 122 (or other suitable aspect of user consumption or engagement with the displayed content). The SDA may predict an end location 146 of the saccade 150 and a duration of the saccade 150. The SDA may determine a saccadic suppression window based at least in part on a predicted duration of the saccade 150. In some embodiments, the prediction of the end location and/or predicted duration may be performed at least in part at a time that is prior to obtaining the eye tracking data and/or prior to detecting the onset of the saccade, and/or may be performed at least in part at a time during the occurrence of the saccade. In example 104 of FIG. 1C, the SDA may modify the content item 132 during the saccadic suppression window, such as by replacing content item 132 with content item 136. In some embodiments, the saccadic suppression window may include a time period prior to the onset of a saccade (e.g., 40 ms), a duration of the saccade (e.g., 20-40 ms) and a time period after the saccade (e.g., 80 ms).

Figure 4:
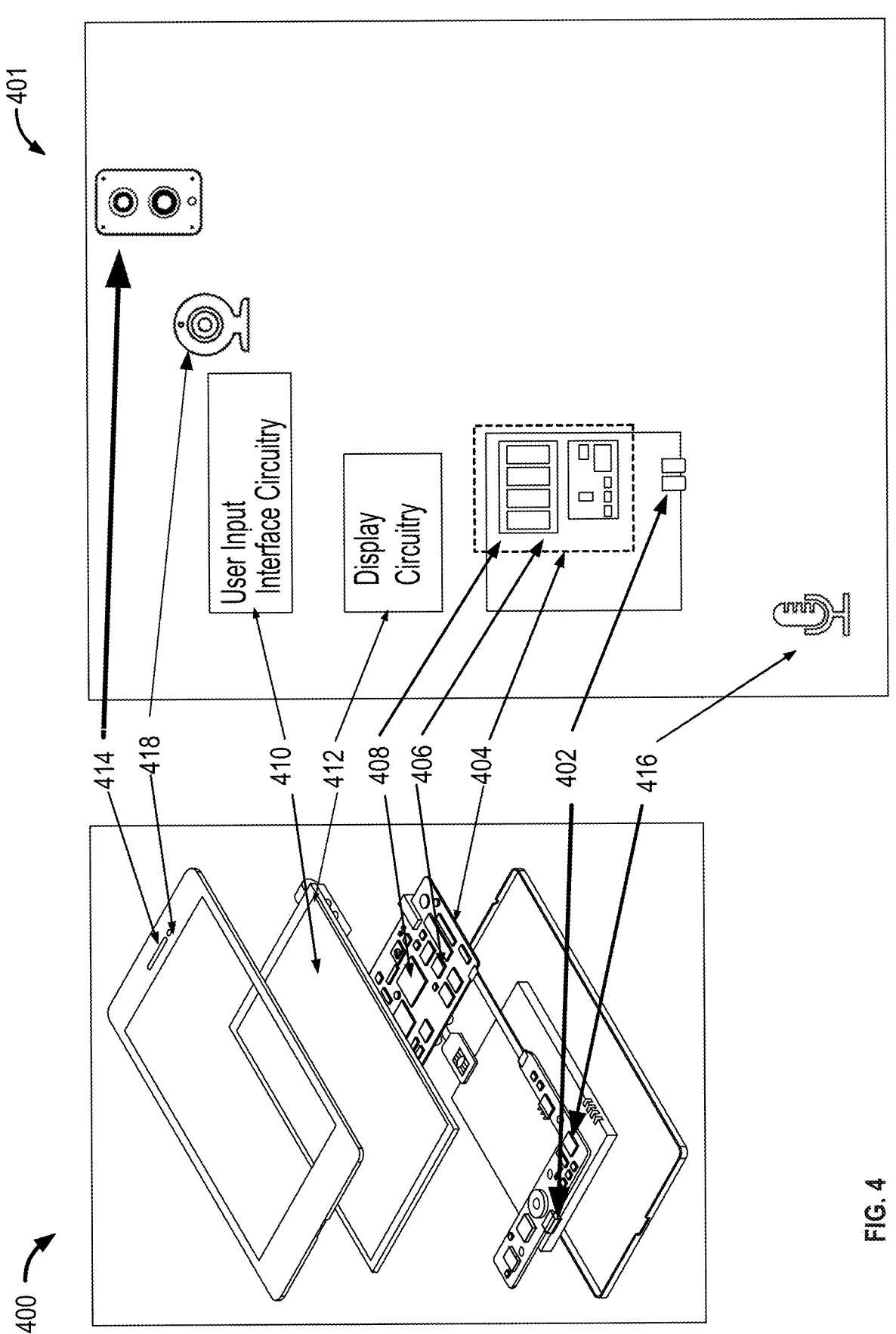
FIG. 4 shows an illustrative user equipment device, in accordance with an embodiment of the disclosure.
Figure 5:
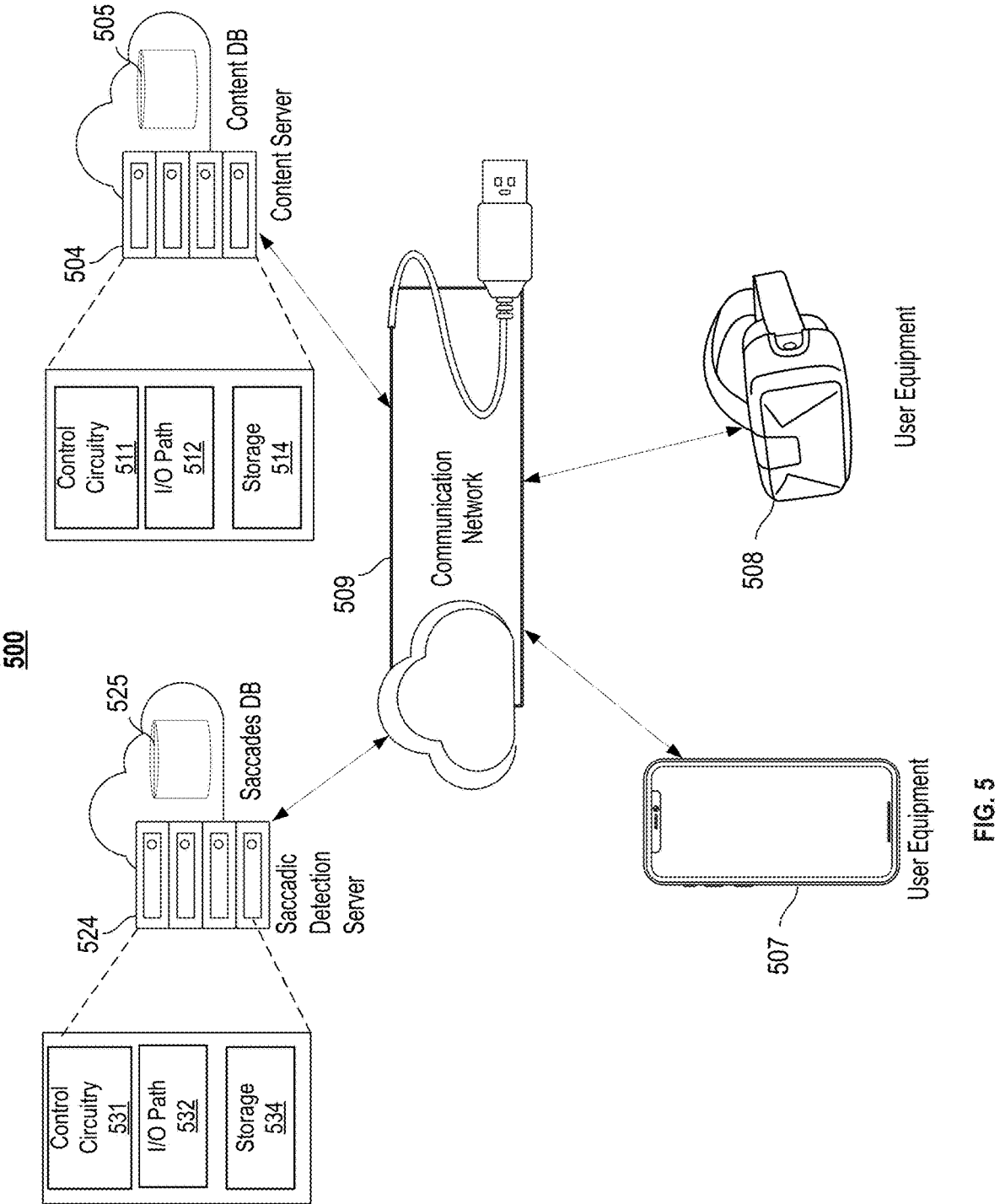
FIG. 5 shows an illustrative system, in accordance with some embodiments of this disclosure, in accordance with an embodiment of the disclosure.

In some examples, the SDA may be executed at least in part at user device 120, user devices 400 or 401 of FIG. 4, databases 505 or 525 of FIG. 5, and/or servers 504 or 524 of FIG. 5, or one or more remote servers, and/or at or distributed across any of one or more other suitable computing devices, in communication over any suitable type of network (e.g., the Internet). In some embodiments, user device 120 may be, for example, a smartphone, a tablet, a handheld device, a laptop, a television set, an XR device such as a head-mounted display (HMD), or any other suitable device capable of displaying content or various content items. "Content" or "content item" can refer to any suitable visual, audio, or audiovisual (e.g., video) content, including: 3D content; portions of a content item; background of a region of screen space unoccupied by visual, audio, or audiovisual content; or a combination thereof. In some embodiments, user device 120 is communicatively connected to one or more sensors configured to collect eye movement data and track a user's gaze. As described herein, a region on a display 122 of user device 120 may refer to a region of screen space, or other suitable location or position on the display. In some examples, such as where the user device is an XR device or other suitable 3D image-rendering device, the region may refer to a 3D region, or other suitable location or position within the field of view of the display of the user device. For instance, a content item can be displayed at a particular region on the display 122 of the user device 120. A location of a user's gaze (e.g., a saccade location, such as a saccade end location) may refer to a particular point on display 122. In some examples, the location of the user's gaze may refer to a region comprising a group of points on display 122.

Referring now to example 100 of FIG. 1A in greater detail, the SDA may present various content items to user 110 at various screen space (or field-of-view) regions on display 122 of user device 120. For instance, the SDA may display content item 130 at region 124, content item 132 at region 126, and content item 134 at region 128. The SDA may identify a content item (e.g., content item 132) to be modified during a saccadic suppression window (e.g., corresponding to a particular saccade 150) of user 110. The SDA may make this identification at a time before the particular saccade 150 (e.g., point 152). Content items 130, 132, 134, and 136 may be, for example, advertisements, content recommendations (e.g., user 110 may be scrolling through recommended movies or television shows), articles, academic or educational materials (e.g., user 110 may be studying for a test), selectable objects, statistics or data in a sports game or other suitable type of content, images, videos, emojis, GIFs, memes, or any other suitable content for which a user's engagement may be measured, or any suitable combination thereof.

According to some embodiments, the SDA identifies content item 132 to be modified based on a user engagement level associated with content item 132. In some embodiments, the user engagement level associated with the content item 132 is based on a level of user engagement with a product featured therein. In an example, the SDA may determine that content item 132 is associated with low user engagement with respect to user 110 (e.g., which may indicate that user 110 is not interested in content item 132) and therefore should be modified or replaced with a more engaging content item. For instance, if user 110 has demonstrated low engagement with an image of airplanes, then the SDA may replace the airplane image with an image of cats. In an alternative example, the SDA may determine that content item 132 is associated with high user engagement with respect to user 110 (e.g., which may indicate that user 110 has sufficiently engaged or interacted with content item 132 and is ready to interact further with related content) and therefore should be modified or replaced with a subsequent content item (e.g., that is contextually relevant to the previous content item). For instance, if user 110 has demonstrated high engagement with an advertisement for flights, then the SDA may replace the flight advertisement with an advertisement for hotel bookings.

In some embodiments, the SDA may determine the user engagement level based on any suitable measurement or combination of measurements (e.g., that may be determined based on eye tracking data of user 110). For example, user engagement level may be measured by the amount of time user 110 has spent looking at content item 132 (e.g., when gaze is directed at anywhere within region 126, such as location 142). In some examples, the user engagement level may be measured by the number of times the gaze of user 110 returns to content item 132 (e.g., the number of impressions made by the content item 132 on the user 110) within a particular time period (e.g., one minute, five minutes). In some examples, the user engagement level with a content item may be measured by the number of saccades that occur within a bounding region of that content item (e.g., within a period of time). For instance, the SDA may calculate the number of saccades of user 110 that occur within the rectangular bounding region of content item 132 (e.g., within the perimeter of region 126). In another instance, the SDA may calculate the number of saccades of user 110 that occur within a certain distance from a particular location (e.g., 10 mm from any point within region 126). In some examples, the user engagement level may be measured based on the length of time during which the user 110 has not scrolled past (e.g., skipped over) the content item 132. In some examples, the user engagement level may be measure based on user actions (or a log of user actions) in relation to the content item 132, such as clicking, flagging, closing, skipping, hiding, or moving the content item 132.

Additionally, or alternatively, the SDA may select content item 132 to modify based on any other suitable factor, such as determining that a certain amount of time has passed since content item 132 was initially displayed, regardless of engagement by user 110.

In some embodiments, the SDA compares user engagement level with content item 132 with a particular threshold to determine whether the user engagement level is high or low. For example, where user engagement level is based on gaze time, the threshold value may be an average gaze time of user 110 directed at any given content item, an average gaze time of a sample of multiple users directed at any given content item, or an average gaze time of a sample of multiple users directed at content item 132 in particular. In some embodiments, if a user has, for example, selected a link corresponding to a content item and/or purchased a product or service associated with the content item, the SDA may determine that a level of user engagement with that content item exceeds a threshold. Alternatively, the SDA in such a circumstance may determine that the level of user engagement does not exceed a threshold, e.g., since a user may be unlikely to interact with such content item again as the user has already viewed the content item and/or taken actions (e.g., purchase of a product or service) in relation to the content item.

Figures 2B, 3:
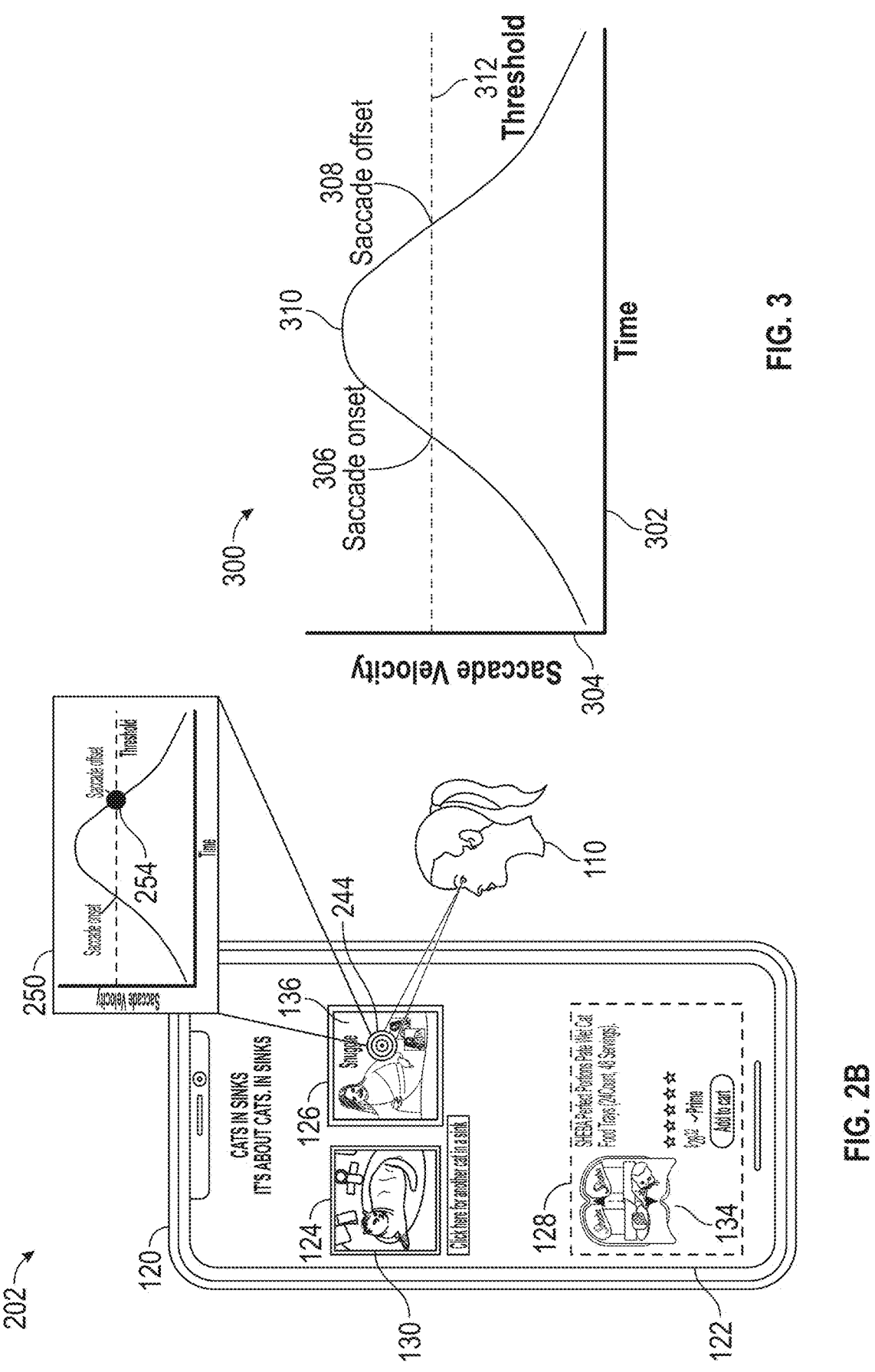

Referring now to example 102 of FIG. 1B, the SDA may detect, based on eye tracking data of the user 110, the onset 154 of a saccade 150 of user 110. In some embodiments, the SDA detects the onset (e.g., point 154) of saccade 150 when eye movement velocity reaches a certain threshold, as illustrated in FIG. 3. For example, as shown in FIG. 3, a saccade may occur when eye movement velocity reaches a velocity threshold 312 (e.g., at point 306). Accordingly, in example 102 of FIG. 1B, the saccade 150 may begin at a current location 144, at which time the velocity of user's 110 eye movement increases and reaches the threshold (e.g., at point 154).

The SDA may predict an end location of saccade 150 (e.g., location 146 corresponding to point 156, when the saccade 150 is offset). In some embodiments, the SDA performs the saccade end location prediction prior to the onset of saccade 150 and/or prior to obtaining or processing eye tracking data in relation to the displayed content items. In some embodiments, the SDA additionally or alternatively performs at least a portion of saccade end location prediction in real time during the live saccade. In some embodiments, the SDA performs both pre-saccadic and live-saccadic predictions of the end location (e.g., wherein the SDA uses one of the predictions to refine the accuracy of the other prediction).

According to some embodiments, the SDA predicts the saccade end location prior to saccade onset, based on visual and semantic analysis of the displayed content. For each onscreen content item 130, 132, 134, the SDA may determine a respective visual saliency score, a respective semantic saliency score, motion saliency score, any other score based on any suitable attributes of the content items, or a combination thereof (e.g., an overall saliency score, also referred to as "overall salience score"). The SDA may use the various scores to predict eye movement patterns of the user. For example, the various scores may indicate a likelihood of capturing the attention of the user and drawing the user's gaze toward the screen space region or location of the corresponding content item. In some embodiments, the various scores can be determined for a content item, a portion of the content item (e.g., a center portion, a quadrant, or coordinates of a point or group of points within a particular content item), a region in which no content item is currently displayed but that includes one or more visual attributes (e.g., background space having a particular color or texture), a graphical user interface (GUI) element associated with an input device (e.g., a mouse cursor or remote control cursor), or a combination thereof.

The visual saliency score (also referred to as "visual salience score") may be determined based on visual properties of the content item, such as color, contrast, or texture, and/or any other suitable properties of the content item. For example, a content item with prominent visual attributes (e.g., shiny texture, bright colors, or bold contrasts) may have a higher visual saliency score than a content item with less conspicuous visual attributes (e.g., dark colors, dull texture, low contrast) because visually prominent attributes may be more likely to capture the user's attention (e.g., via the user's peripheral vision) and draw the user's gaze toward such content.

The semantic saliency score (also referred to as "semantic salience score") may be determined based on semantic features of the content item, such as genre, classifications of objects within the content item, or other suitable features associated with the user's preferences or interests. For example, the SDA may retrieve user preferences of user 110 and compare the preferences with the content of each onscreen content item (e.g., via topic targeting or other suitable technique) to generate a semantic salience score for each content item. For example, user profile data may indicate that user 110 has a high interest in cats but low interest in planes. Therefore, there is a high likelihood that user 110 will look at content related to cats. Thus, content featuring cats may have a higher saliency score than content without cats. Likewise, content featuring planes may have a low saliency score. In some embodiments, the SDA calculates a saliency score (e.g., visual saliency, semantic saliency, or saliency of other suitable attributes) based on the user's past behavior and patterns in visual or semantic attributes across various content items that the user has historically engaged with. For instance, content related to cats may be displayed in region 128 (e.g., content item 134 presenting images of cats on cat food packaging). While user 110 is currently looking at text at location 144, they may notice via their peripheral vision the salient features of the cat images at region 128, which draw the user's 110 eyes toward region 128 (or a specific portion or point therein, such as location 146).

The overall salience score may be calculated based on combining the visual saliency score with the semantic saliency score, and any other suitable saliency score (e.g., motion saliency score based on movement of objects within the content item).

The SDA may rank the respective overall saliency score of each displayed content item 130, 132, 134, and determine that the region associated with the content item with the highest or relatively high overall saliency score will be most likely to be or include the end location. For example, based on content item 134 having the highest or relatively high overall saliency score, the SDA may determine that the end location of saccade 150 will likely be region 128. In some examples, the SDA may further determine, based on the saliency of various particular features within the content item 134, that a specific location within the region 128 (e.g., location 146) would be the likely end location of the saccade 150. In other examples, the SDA may compare the respective overall saliency score associated with each content item to a threshold. The SDA may determine that the region of the content item (or a location therein) with an overall saliency score that exceeds the threshold will be the end location of the saccade 150.

In some embodiments, the SDA predicts the end location based at least in part on visual hierarchy of the layout of the content items on the display. Certain layout scanning patterns may be associated with certain layouts. A layout that is dense with textual content may be more likely to elicit eye movement that resembles the letter "F" (e.g., F-pattern scan). A layout that includes more image content than textual content may be more likely to elicit eye movement that resembles the letter "Z" (e.g., Z-pattern scan). In some examples, based on comparing the current location 144 and the scanning pattern associated with the layout of content items 130, 132, 134, the SDA may predict the eye movement of user 110 when viewing the display 122. The SDA may identify a possible location (e.g., location 146) that is along the path of the predicted eye movement as the end location.

In some embodiments, the SDA predicts the end location based at least in part on the onscreen location of a GUI element associated with an input device (e.g., a mouse cursor or remote-control cursor) that is communicatively connected with device 120. For instance, a mouse cursor (not shown) may be resting at location 146. Although the user 110 may be interested in looking at content item 130 (e.g., at region 124), user 110 may be more likely to look back at the mouse cursor at location 146 (e.g., so that they can move the cursor to click on content item 130 at region 124).

According to some embodiments, the SDA predicts the saccade end location in real time (e.g., during the occurrence of the saccade), based on saccade analysis (e.g., eye movement analysis). For example, as illustrated in FIG. 3, the SDA may calculate saccadic velocity 304 based on eye movement data. The saccadic velocity 304 can be used to identify various stages of the saccade 300 (e.g., corresponding to saccade 150 of FIG. 1B), such as the onset (e.g., point 306, corresponding to point 154 of FIG. 1B), the peak velocity (e.g., point 310), and the offset (e.g., point 308, corresponding to point 156 of FIG. 1B). In some embodiments, based on eye movement occurring during the first few frames of the saccade 300 (e.g., during a time between the saccade onset 306 and the peak velocity 310), the SDA can predict the saccade end location. For instance, based on the peak velocity 310 of the saccade, the SDA can predict the distance remaining in the saccade. Based on the angle between the screen space starting location corresponding to the saccade onset (e.g., current location 144) and an intermediary location corresponding to the peak velocity 310 (not shown), the SDA can determine the direction of the saccade. Based on the predicted remaining distance in the saccade and the predicted direction of the saccade, the SDA can predict the end location of the saccade (e.g., location 146), using polynomial fitting, a recurrent neural network (RNN) model, or any other suitable model.

In some embodiments, the real-time (e.g., live) saccade end location prediction increases a confidence level of an initial saccade end location prediction (e.g., performed prior to the saccade onset). For instance, the SDA may perform an initial prediction (e.g., prior to the saccade) of the saccade end location with a particular level of confidence, based on a saliency score, layout scan pattern, or both. The SDA may perform a subsequent prediction (e.g., during the saccade) that increases the confidence level of the initial prediction, based on eye movement analysis during the saccade. For instance, the initial end location prediction may correspond to the subsequent end location prediction (and/or a current path of the saccade, determined in real time) with a certain level of confidence. In some examples, before onset of saccade 150, the SDA may determine, based on a respective overall saliency score of each content item 130, 132, 134, that content item 134 has the highest or relatively high overall saliency score. Thus, the corresponding region (e.g., region 128) will most likely include the saccade end location. In another example, the SDA may identify a group of content items with respective saliency scores that are over a saliency threshold (such as content items 132 and 134) and that their corresponding regions (e.g., regions 126 and 128, respectively) are the most likely regions to include the saccade end location. Since the initial prediction reduces the number of samples (e.g., removes regions toward which the saccade is unlikely to travel) for calculating the subsequent prediction, the SDA may predict the saccade end location within the identified likely regions with increased confidence, as well as enabling higher performance and requiring less capable hardware. Thus, in the example, the initial prediction may identify region 128 as the region that the saccade 150 is likely to travel toward and the subsequent prediction may identify location 146 within region 128 as the most likely saccade end location.

According to some embodiments, the SDA determines whether to, and when to, modify content item 132 based on determining that the predicted end location 146 is at least a threshold distance away from the content item 132. When the user's 110 gaze is at a location (e.g., end location 146) that is far enough away from the content item to be modified, the user 110 may be less likely to perceive or be distracted by the change (e.g., which is occurring at another region on the display 122).

In some embodiments, the predicted end location is located offscreen. In some examples, once the user's gaze moves offscreen, the SDA may modify content item 132. In another example, the SDA may modify content item 132 if it determines that the offscreen end location is at least a threshold distance away from the content item 132.

In some embodiments, the SDA predetermines a desired saccade end location and elicits a saccade toward the predetermined location (e.g., directs the user's 110 gaze away from the location of the content item to be modified by at least a threshold distance). For example, the SDA may present visual stimuli, such as a visually salient feature (e.g., a small circle flashing once then disappearing, or a video, or interactive content), at some distance (e.g., an opposite corner of the screen) from the content item to be modified (e.g., content item 132). The visual stimuli may elicit an involuntary saccade from user 110, due to the human tendency to shift their attention to visually salient features (e.g., shiny or colorful) that are within their field of view. In some examples, the SDA may elicit a saccade if it detects, via eye tracking data, that user 110 has not moved their eyes sufficiently far from the content item identified to be modified (e.g., user's 110 gaze has not moved a certain distance away from content item 132). In some examples, the SDA may elicit a saccade if it determines that content modification or content switching (e.g., modifying or replacing the content in region 126) is occurring at an insufficient rate. For instance, user's 110 gaze has not moved away from content item 132 after a certain amount of time for the SDA to modify or replace content item 132 in a manner that is minimally perceptive to user 110.

According to some embodiments, the SDA predicts the duration of the saccade using calculations based on the predicted end location and the peak velocity of the saccade. The SDA may determine the remaining distance in the saccade based on the distance between the current location 144 and the predicted end location 146. The SDA may also determine, based on the peak velocity, the amount of time and distance that are remaining in the saccade. For instance, longer saccades reach a higher peak velocity. The combination of the calculated remaining amount of time and distance in the saccade can then be used to determine the duration of the saccade. The SDA may then determine a saccadic suppression window based on the predicted duration of the saccade.

Referring now to example 104 of FIG. 1C, based on the saccadic suppression window of saccade 150, the SDA modifies or switches content item 132 such that the modification is minimally perceptible to user 110. In some embodiments, the SDA modifies or switches content item 132 based on both the saccadic suppression window and the predicted end location 146. The modified content item may be more visually appealing to the user 110 than before the modification. In some embodiments, the SDA modifies or switches the content item when the saccade 150 is complete (e.g., when saccade velocity goes down to or below a threshold at point 156), when the saccade velocity has a confidence value below a threshold, the end location 146 has a confidence value below a threshold, or a combination thereof).

In some examples, the SDA changes one or more attributes of content item 132, such as color, texture, size, objects, arrangement of objects, movement of objects, visual structure, corresponding text, or any other suitable attribute, or any suitable combination thereof. The attribute change may be based on various factors, including salient features or the saliency score of content item 132, of portions therein, of other onscreen content items (e.g., content items 130, 134), or a combination thereof. For instance, the SDA may calculate a low overall saliency score for content item 132, which may be related to the low user engagement level with content item 132. The SDA may alter one or more attributes in content item 132 to increase its visual appeal to the user 110. In one example, the SDA may determine that content item 132 has a low visual saliency score because it includes a dull background color. The SDA may modify content item 132 by replacing its background color with a bright background color. In another example, the SDA may determine that content item 132 has a low semantic saliency score because it features an object in which user 110 has low interest, such as an airplane. The SDA may modify content item 132 by replacing the airplane with an object in which user 110 has higher interest, such as a cat. In yet another example, the SDA may change one or more attributes of the content item 132 based on attributes of the background (e.g., page) of the display 122. For instance, a featured product in content item 132 that is beige may blend into a beige page. The SDA may change the color of the featured product to red, which would stand out against the beige page and attract the user's 110 attention.

In some embodiments, the SDA modifies content item 132 by placing or replacing certain featured products therein. In some examples, the SDA may move a product already featured within content item 132 from one position to a more prominent position or change various attributes of the product (e.g., color, flashing lights, size).

In some embodiments, each content item is wrapped in a container format which specifies default values or allowed values for various visual or semantic attributes within the content item. For example, content item 132 may have default values corresponding to its color or color pattern (e.g., blue background or black and white striped pattern), background texture (e.g., shiny background), arrangement of visual elements therein, other suitable visual or semantic features, or a combination thereof. The SDA may calculate the saliency score (e.g., visual saliency, semantic saliency, or both) of content item 132. For instance, the salience score of content item 132 may be calculated over all of the plurality of content items (e.g., 124, 126, 128) in view. Based on the calculated saliency score (e.g., if it is below a certain threshold score), the SDA may enhance the appeal (e.g. saliency) of content item 132 to user 110 by changing one or more default values of the content item 132 during the saccadic suppression window of user 110. For instance, the SDA may alter the values for background color (e.g., change the background color of content item 132 from blue to red). In some embodiments, certain default values may correspond to visual or semantic attributes of one or more objects featured within a content item. For instance, the plane featured in content item 132 may correspond with default values for color or texture (e.g., white), size (e.g., small), position within content item 132 (e.g., lower left corner of region 126), or any other suitable attribute. The SDA may calculate the saliency score of the featured plane as currently displayed (e.g., in view of the entirety of content item 132 or in view of all of the currently displayed content items in regions 124, 126, 128). If the saliency score of the plane is below a threshold, the SDA may enhance the appeal of the plane to user 110 by modifying default values of the plane. For instance, the SDA may change values of the plane's size (e.g., from small to large) or its position within content item 132 (e.g., move display of the plane from the lower left corner of region 126 to the center of region 126).

In some embodiments, the SDA modifies content item 132 by relocating it to another region. For example, the SDA may determine that the user 110 simply did not notice content item 132 (e.g., user's 110 gaze was never directed toward region 126). Therefore, the SDA may maintain the contents of content item 132 but relocate it to a more suitable location where the user 110 is likely to look, or has a tendency to look, based on past behavior (e.g., from region 126 to region 128).

In some examples, the modification of content item 132 is a gradual modification over a period of time. In other examples, the modification of content item 132 is an abrupt or singular modification. In yet another example, the modification of content item 132 occurs over a duration across multiple consecutive saccades.

In some examples, the degree or magnitude of the modification of content item 132 may be based on the duration of the saccade. For example, more dramatic changes (e.g., replacing content item 132 with another content item having entirely different visual and semantic features, or changing a dull background of content item 132 to a bright and bold background color) may be made during a longer saccade.

In some embodiments, the SDA modifies content item 132 by replacing it with another content item (e.g., content item 136). For example, the SDA may select a replacement content item based on visual similarity with the original content item (e.g., similar visual attributes, semantic attributes, other suitable attributes, or a combination thereof), such that user 110 is less likely to perceive that content item 132 has been replaced after the saccade 150 ends. For example, while the original content item 132 may feature airplanes and the replacement content item 136 may feature cats, both content items may share similar background colors or textures.

In some embodiments, the SDA pre-fetches the replacement content item from storage, for example, at a time when the SDA marks content item 132 to be modified or replaced (e.g., when the SDA determines that content item 132 is associated with a low user engagement level). Pre-fetching the replacement content item can reduce latency in modifying or replacing content item 132 during the saccade 150. In some examples, the SDA groups multiple stored content items based on visual similarity. For instance, each displayed content item 130, 132, 134 may be associated with a respective group of content items that includes potential replacement content items that are visually similar to the associated original content item 130, 132, 134. The SDA can pre-fetch the group of content items and periodically switch between content items in the group to replace content item 132. For example, the SDA may switch the content item displayed in region 126 with a different content item from the group after every set of saccades (e.g., five saccades, ten saccades), which further reduces latency that might otherwise result from identifying, searching for, and presenting the replacement content item 136 at the end of each set of saccades. In some instances, the SDA may use a supply-side platform (SSP) of a Real-Time Bidding (RTB) system to group the content items (or their corresponding thumbnails) based on their visual similarity.

In some embodiments, the SDA continues to monitor the user engagement level with the modified or replaced content item, for instance by counting the number of impressions made by the content item on the user (e.g., the number of times the user's gaze returns to the same content item). In some examples, the SDA may count each time user 110 views the modified or replaced content item as a new content item impression when determining user engagement.

In some embodiments, the modifications may be performed on-device (e.g., device 120) or in the cloud, with new rendered frames delivered over a network (such as network 509 as illustrated in FIG. 5). For example, a 3D content item may be delivered to an HMD as one or more objects wrapped in a scene graph container. Various alternate values may be specified for object attributes (e.g., color or texture), along with a default value. Initially, the content item may be rendered with default values for objects. The SDA may perform (e.g., via an analysis module associated with the HMD) a saliency analysis (e.g., visual saliency, semantic saliency, motion saliency, or a combination thereof) in real time based on all of the onscreen content items. Based on the saliency analysis, the SDA may select an alternate value for one or more object attributes in the content item if the saliency analysis yields a value below a threshold. The SDA may then modify or replace such attributes in the content item (e.g., with attributes having a saliency score above the threshold).

According to some embodiments, the SDA determines the duration (e.g., frequency) between modifying or switching the content items based on various factors. For example, the duration may be based on the minimum duration between switches or modifications to prevent user 110 from being overwhelmed with frequent modifications. In another example, the SDA may limit the number of switches or modifications for a session during which the user views content. In yet another example, the SDA may configure the duration to be static (e.g., no more than once per two seconds per user, or no more than three times for a single page). In some examples, the duration may be dynamic. For instance, based on eye movement data of the user 110, the SDA may determine a cognitive load score, a perceptual load score, any other suitable measure of the user's 110 attention with respect to the displayed content, or a combination thereof, associated with user 110. For example, the cognitive load score may indicate the amount of semantic information, or other suitable information, in the displayed content that user 110 can process for a certain period of time. The perceptual load score may indicate the amount of visual information, or other suitable information, in the displayed content for a certain period of time. The cognitive and perceptual load scores may change over time or based on the type of content presented. The duration between switching or modifying content may then be determined based on the dynamic cognitive and perceptual load scores.

In some embodiments, the SDA may provide UI elements to navigate between content items that have been switched or modified. For instance, in example 104 of FIG. 1C, the SDA has replaced content item 132 with content item 136, but user 110 may wish to view content item 132 again or may find they have not sufficiently engaged with content item 132 before it was replaced. In some embodiments, user 110 can use the navigation elements to return to previous content item 132 or navigate back and forth between content items 132 and 136. Additionally, or alternatively, in some examples, the navigation elements may allow user 110 to skip to a new content item for a particular region (e.g., region 124), navigate back and forth between different iterations of a content item (e.g., between a modified and unmodified version of content item 132), move to a previous view of the content items (e.g., if a content item was relocated from region 126 to region 128), or other suitable navigation request with respect to viewing content items. The SDA may update (e.g., increase) the user engagement level of a previous content item that the user 110 navigates to or update (e.g., decrease) the user engagement level with a current content item that the user 110 navigates away from.

FIGS. 2A and 2B show example scenarios 200, 202, respectively, of continuing to display unmodified content based on a saccade of a user, in accordance with an embodiment of the disclosure. Referring to example 200 of FIG. 2A, the user 110 may demonstrate high user engagement with content item 134. In some embodiments, because the content item 134 is associated with a high user engagement level, the user 110 may wish to continue engaging with it, even after a saccade 250 temporarily directs the user's 110 gaze away from content item 134. The SDA marks content item 134 to remain unmodified or unreplaced. Thus, in example 202, after the saccade 250, display of content item 134 persists.

In some embodiments, the SDA may continue to display certain content items unmodified and unreplaced, even if they are associated with a low user engagement level. For example, certain content items may include an urgent message that requires the user's 110 attention or response. The SDA may continue to display such content items for an extended period of time to ensure that user 110 sees them or until the user 110 has sufficiently engaged with them.

FIG. 3 shows an example timeline of a saccade 300, in accordance with an embodiment of the disclosure. In some embodiments, the SDA detects the saccade 300 using sensors for tracking eye movement, such as a webcam, a front-facing smartphone camera, dedicated infrared (IR)-based eye trackers (e.g., installed in XR head-mounted displays), or other suitable equipment. The SDA may detect saccades and their peak velocity using a particular sampling rate (e.g., 50 Hz). Higher sampling rates can improve accuracy and detection rates. The SDA may detect saccade onset and offset based on whether the tracked saccade velocity or acceleration reaches a particular velocity threshold.

In some embodiments, the SDA may dynamically adjust the number of eye tracking samples used to detect the onset of a saccade based on hardware parameters (e.g., sampling rate of IR receivers) and current performance (e.g., dips in framerate). In some embodiments, the saccade velocity threshold 312 (e.g., for detecting saccade onset and peak of saccade) is dynamically adjusted based on differences in hardware capabilities (e.g., low sampling rate) or application performance that may affect the ability of the sensors to detect the peak velocity 310.

FIGS. 4-5 depict illustrative devices, systems, servers, and related hardware for modifying displayed content based on a saccade of a user, in accordance with some embodiments of this disclosure. FIG. 4 shows generalized embodiments of illustrative user equipment devices 400 and 401, which may correspond to the above-described user device (e.g., user device 120). In some embodiments, user equipment device 400, 401 is a smartphone device, a tablet, an XR device such as a head-mounted display (HMD), or any other suitable device capable of displaying XR content, smart TV, IoT device, smart assistant device or home assistant device, a camera device or any other suitable computing device, a network-based server hosting a user-accessible client device, a non-user-owned device, any other suitable device, or any combination thereof. Each of user equipment device 400, 401 is communicatively connected to at least one of microphone 416, audio input equipment, camera 418, display circuitry 412, user input interface circuitry 410, and GPS/navigation circuitry 420. For example, display 412 may be a computer display, a 3D display (such as, for example, a tensor display, a light field display, a volumetric display, a multi-layer display, an LCD display or any other suitable type of display, or any combination thereof). For example, user input interface 410 may be a remote-control device.

In some embodiments, each one of user equipment device 400, 401 receives content and data via input/output (I/O) path (e.g., circuitry) 402. I/O path 402 provides data to control circuitry 404, which comprises processing circuitry 406 and storage 408. Control circuitry 404 is used to send and receive commands, requests, and other suitable data using I/O path 402, which comprises I/O circuitry. I/O path 402 connects control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable control circuitry such as processing circuitry 406. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for the SDA or other suitable application stored in memory (e.g., storage 408). Specifically, control circuitry 404 may be instructed by the SDA to perform the functions discussed above and below. In some implementations, processing or actions performed by control circuitry 404 may be based on instructions received from the SDA or other suitable application or platform.

In some client/server-based embodiments, control circuitry 404 may include communications circuitry suitable for communicating with a server or other networks or servers. The SDA is a stand-alone application implemented on a device or a server. The SDA may be implemented as software or a set of executable instructions. The instructions for performing any of the embodiments discussed herein of the SDA may be encoded on non-transitory computer-readable media (e.g., a hard drive, random-access memory on a DRAM integrated circuit, read-only memory on a BLU-RAY disk, etc.). For example, in FIG. 4, the instructions may be stored in storage 408, and executed by control circuitry 404 of a device 400, 401.

In some embodiments, the SDA is a client/server application where only the client application resides on device 400, 401 and a server application resides on an external server (e.g., server 504, 524). For example, the SDA may be implemented partially as a client application on control circuitry 404 of device 400, 401 and partially on server 504, 524 as a server application running on control circuitry 511, 531, respectively. Server 504, 524 may be a part of a local area network with one or more of devices 400, 401 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., server 504, 524), referred to as "the cloud." Device 400, 401 may be a cloud client that relies on the cloud computing capabilities from server 504, 524 to receive and process encoded data. When executed by control circuitry of server 504, 524 the SDA instructs control circuitry 511, 531, respectively, to perform processing tasks for the client device.

Control circuitry 404 may include communications circuitry suitable for communicating with a server, edge computing systems and devices, a table or database server, or other networks or servers. The instructions for carrying out the above-mentioned functionality may be stored on a server (which is described in more detail in connection with FIG. 5). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media application and/or gaze mapping application data described above. Nonvolatile memory may also be used (e.g., to launch a boot-up routine and other instructions). Cloud-based storage, described in relation to FIG. 4, may be used to supplement storage 408 or instead of storage 408.

Control circuitry 404 may include video generating circuitry and tuning circuitry, such as one or more analog tuners, one or more H.265 decoders or any other suitable digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of user equipment 400, 401. Control circuitry 404 may also include digital-to-analog converter circuitry and analog-to-digital converter circuitry for converting between digital and analog signals. The tuning and encoding circuitry may be used by user equipment device 400, 401 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment device 400, the tuning and encoding circuitry (including multiple tuners) may be associated with storage 408.

Control circuitry 404 may receive instruction from a user by way of user input interface circuitry 410. User input circuitry 410 may be any suitable user interface circuitry, such as a remote control, mouse, trackball, keypad, keyboard, touch screen, touchpad, stylus input, joystick, voice recognition interface, or other user input interfaces. Display circuitry 412 may be provided as a stand-alone device or integrated with other elements of each one of user equipment device 400, 401. For example, display circuitry 412 may be a touchscreen or touch-sensitive display. In such circumstances, user input interface circuitry 410 may be integrated with or combined with display circuitry 412. In some embodiments, user input interface circuitry 410 includes a remote-control device having one or more microphones, buttons, keypads, any other components configured to receive user input or combinations thereof. For example, user input interface circuitry 410 may include a handheld remote-control device having an alphanumeric keypad and option buttons.

Audio output equipment 414 may be integrated with or combined with display circuitry 412. Display circuitry 412 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display circuitry 412. Audio output equipment 414 may be provided as integrated with other elements of each one of device 400 and equipment 401 or may be stand-alone units. An audio component of videos and other content displayed on display circuitry 412 may be played through speakers (or headphones) of audio output equipment 414. In some embodiments, audio may be distributed to a receiver (not shown), which processes and outputs the audio via speakers of audio output equipment 414. In some embodiments, for example, control circuitry 404 is configured to provide audio cues to a user, or other audio feedback to a user, using speakers of audio output equipment 414. There may be a separate microphone 416 or audio output equipment 414 may include a microphone configured to receive audio input such as voice commands or speech. For example, a user may speak letters or words that are received by the microphone and converted to text by control circuitry 404. In a further example, a user may voice commands that are received by a microphone and recognized by control circuitry 404. Camera 418 may be any suitable video camera integrated with the equipment or externally connected. Camera 418 may be a digital camera comprising a charge-coupled device (CCD) and/or a complementary metal-oxide semiconductor (CMOS) image sensor. Camera 418 may be an analog camera that converts to digital images via a video card.

The SDA may be implemented using any suitable architecture. For example, it may be a stand-alone application wholly-implemented on each one of user equipment device 400 and user equipment device 401. In such an approach, instructions of the application may be stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to provide encoding/decoding functionality and preform any of the actions discussed herein. Based on the processed instructions, control circuitry 404 may determine what action to perform when input is received from user input interface circuitry 410. For example, movement of a cursor on a display up/down may be indicated by the processed instructions when user input interface circuitry 410 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the SDA is a client/server-based application. Data for use by a thick or thin client implemented on each one of user equipment device 400 and user equipment device 401 may be retrieved on-demand by issuing requests to a server remote to each one of user equipment device 400 and user equipment device 401. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on device 400, 401. This way, the processing of the instructions is performed remotely by the server while the resulting displays (e.g., that may include text, a keyboard, or other visuals) are provided locally on device 400, 401. Device 400, 401 may receive inputs from the user via input interface circuitry 410 and transmit those inputs to the remote server for processing and generating the corresponding displays. For example, device 400, 401 may transmit a communication to the remote server indicating that an up/down button was selected via input interface circuitry 410. The remote server may process instructions in accordance with that input and generate a display of the application corresponding to the input (e.g., a display that moves a cursor up/down). The generated display is then transmitted to device 400, 401 for presentation to the user.

In some embodiments, the SDA may be downloaded and interpreted or otherwise run by an interpreter or virtual machine (run by control circuitry 404). In some embodiments, the SDA may be encoded in the ETV Binary Interchange Format (EBIF), received by control circuitry 404 as part of a suitable feed, and interpreted by a user agent running on control circuitry 404. For example, the media application and/or gaze mapping application may be an EBIF application. In some embodiments, the SDA may be defined by a series of JAVA-based files that are received and run by a local virtual machine or other suitable middleware executed by control circuitry 504. In some of such embodiments (e.g., those employing MPEG-2 or other digital media encoding schemes), the SDA may be, for example, encoded and transmitted in an MPEG-2 object carousel with the MPEG audio and video packets of a program.

FIG. 5 is a diagram of an illustrative system 500, in accordance with some embodiments of this disclosure. System 500 may comprise user equipment devices 507, 508, and/or networking device 510 and/or any other suitable number and types of user equipment, networking equipment capable of transmitting data by way of communication network 509. User equipment devices 507, 508 may comprise a smartphone device, a tablet, XR device or any other suitable device capable of processing XR content, smart TV, IoT device, smart assistant device or home assistant device, a camera device or any other suitable computing device, a network-based server hosting a user-accessible client device, a non-user-owned device, any other suitable device, or any combination thereof. Networking device 510 may comprise networking equipment such as routers, switches, modems, access points (including mesh access points), repeaters, extenders, Wi-Fi plugs, Wi-Fi nodes, or any other suitable device, or any combination thereof. device. Networking device 510 may be equipped with MIMO (Multiple Input Multiple Output) technologies, e.g., MIMO-OFDM. Communication network 509 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 509) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 5 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 509.

System 500 may comprise content data source 505, saccades data source 525, and/or one or more servers 504, 524. In some embodiments, the SDA may be executed at one or more of control circuitry 511, 531 of servers 504, 524 respectively (and/or control circuitry of user equipment devices 507, 508 and/or networking device 510).

In some embodiments, servers 504, 524 include control circuitry 511, 531 and storage 514, 534 (e.g., RAM, ROM, Hard Disk, Removable Disk, etc.), respectively. Storage 514, 534 may store one or more databases. Server 504, 524 may also include an input/output path 512, 532, respectively. I/O path 512, 532 may provide encoding/decoding data, device information, or other data, over a local area network (LAN) or wide area network (WAN), and/or other content and data to control circuitry 511, 531, which may include processing circuitry, and storage 514, 534, respectively. Control circuitry 511, 531 may be used to send and receive commands, requests, and other suitable data using I/O path 512, 532, respectively, which may comprise I/O circuitry. I/O path 512, 532 may connect control circuitry 511, 531, respectively (and specifically control circuitry) to one or more communications paths.

Control circuitry 511, 531 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 511, 531 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 511, 531 executes instructions for an emulation system application stored in memory (e.g., the storage 514, 534, respectively). Memory may be an electronic storage device provided as storage 514, 534 that is part of control circuitry 511, 531, respectively.

Content data source 505, saccades data source 525, servers 504, 524, or any combination thereof, may include an encoder. Such encoder may comprise any suitable combination of hardware and/or software configured to process data to reduce storage space required to store the data and/or bandwidth required to transmit the image data, while minimizing the impact of the encoding on the quality of the media content being encoded. In some embodiments, the data to be compressed may comprise a raw, uncompressed 3D media content, or 3D media content in any other suitable format. In some embodiments, each of user equipment devices 507, 508, and/or networking device 510 may receive encoded or encoded data locally or over a communication network (e.g., communication network 509 of FIG. 5) and may comprise one or more decoders. Such decoder may comprise any suitable combination of hardware and/or software configured to convert data in a coded form to a form that is usable as video signals and/or audio signals or any other suitable type of data signal, or any combination thereof. User equipment devices 507, 508, and/or networking device 510 may be provided with encoded data. In some embodiments, at least a portion of decoding may be performed remote from user equipment devices 507, 508, and/or networking device 510.

Figure 6:
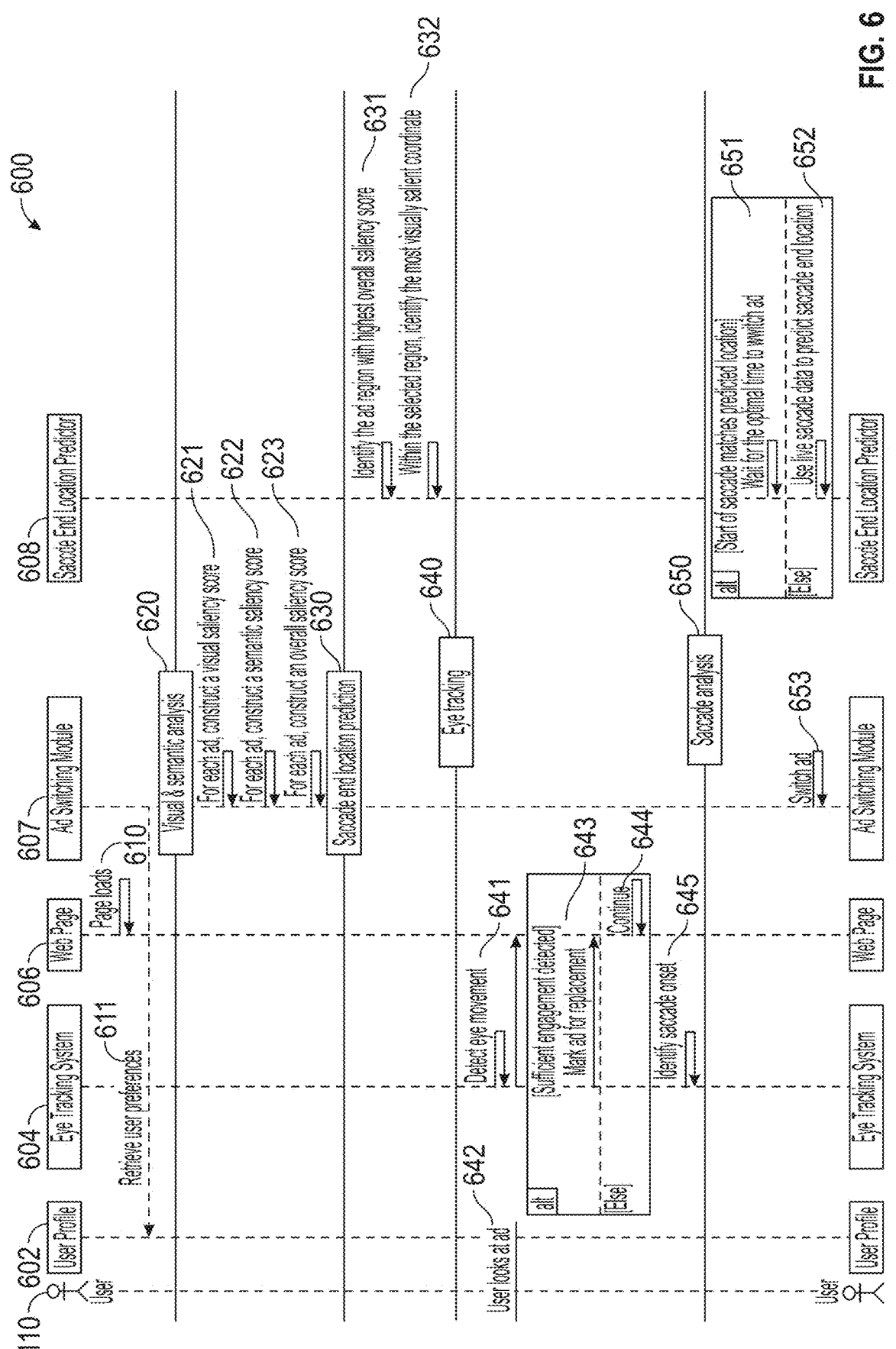
FIG. 6 is a system sequence diagram of an illustrative process for modifying displayed content based on a saccade of a user, in accordance with an embodiment of the disclosure.

FIGS. 6-8 are system sequence diagrams and flowcharts of various processes 600-800, respectively. In various embodiments, the individual steps of each process 600-800 may be implemented by one or more components of the devices and systems of FIGS. 4-5. Although the present disclosure may describe certain steps of each process 600-800 (and of other processes described herein) as being implemented by certain components of the devices and systems of FIGS. 4-5, this is for purposes of illustration only, and it should be understood that other components of the devices and systems of FIGS. 4-5 may implement those steps instead. For example, the steps of each process 600-800 may be executed by server 504, 524 and/or by user equipment device 507, 508, and/or 510 and/or by control circuitry 404 of a device 400, 401 and/or by control circuitry 511, 531 for modifying displayed content based on eye tracking data of the user.

FIG. 6 is a system sequence diagram of an illustrative process 600 for modifying displayed content based on a saccade of a user, in accordance with an embodiment of the disclosure. Although example process 600 as shown describes displaying and modifying advertisements, it is understood that process 600 can be implemented using any suitable content, such as content recommendations (e.g., movies or television shows), articles, academic or educational materials, selectable objects, statistics or data in sports games.

In some embodiments, at step 610, control circuitry 511 (e.g., of content server 504) provides (e.g., by way of a web page 606 or other suitable content provider) content items on a display of a device (e.g., loads a web page with a UI including content items).

At step 611, control circuitry 511 may retrieve user preferences (e.g., from user profile 602) of the user 110.

At steps 621, 622, and 623, control circuitry 511 may perform 620 (e.g., by way of ad switching module 607 or other suitable analysis model) visual and semantic analysis of the displayed content items. For example, at steps 621 and 622, control circuitry 511 may construct, for each content item, a visual saliency score and a semantic saliency score, respectively. At step 623, control circuitry 511 may construct, based on the combination of the visual saliency score, semantic saliency score, and any other suitable saliency score, an overall saliency score for each content item.

At steps 631 and 632, control circuitry 531 (e.g., of saccadic detection server 524) may predict 630 (e.g., by way of a saccade end location predictor 608 or other suitable prediction model) the saccade end location based on the saliency of the content items. For example, at step 631, control circuitry 511 may identify and select the region corresponding to the content item with the highest or relatively high overall saliency score. At step 632, control circuitry 511 may identify, within the selected region, the most visually salient coordinate as the predicted saccade end location.

At steps 641, 642, 643, 644, and 645, control circuitry 531 may collect 640 eye tracking data of the user 110 to determine whether and when to modify a particular content item. For example, at steps 641 and 642, control circuitry 531 may detect (e.g., by way of eye tracking system 604 or other suitable sensor system) eye movement of the user 110 with respect to the a displayed content item. At step 643, if control circuitry 531 determines that, based on the eye movement of the user, that there is sufficient engagement of the user 110 with the content item, then control circuitry 531 marks the content item for replacement. Otherwise, at step 644, control circuitry 531 continues to determine the user engagement level of another displayed content item. At step 645, control circuitry 531 may identify, based on the eye tracking data, the onset of a saccade of the user 110.

At steps 651, 652, and 653, control circuitry 531 may perform 650 saccade analysis to determine the optimal or suitable time to modify the content item marked for replacement. For example, at step 651, control circuitry 511 may wait for the optimal or suitable time to replace the content item. For instance, control circuitry 531 may detect an onset of a saccade and determine that the saccade corresponds to the predicted end location. Based on this determination, control circuitry 511 may replace (e.g., at step 653) the content item during a saccadic suppression window corresponding to the identified saccade. Alternatively, at step 652, control circuitry 531 may detect a saccade and may determine in real time whether the current live saccade is appropriate for replacing the content item. For instance, control circuitry 531 may predict, based on live saccade data (e.g., eye tracking data) the end location of the current saccade. If the predicted end location is beyond a threshold distance from the region corresponding to the content item to be replaced, then control circuitry 511 may replace (e.g., at step 653) the content item during the current saccade.

FIG. 7 is a flowchart of an example process 700 for modifying an object featured within displayed content based on a saccade of a user, in accordance with an embodiment of the disclosure. In some embodiments, at step 702, control circuitry 511 may place an object (e.g., a product or other suitable featured object) in a content item (e.g., a video rendered in real time). At step 704, control circuitry 511 may measure eye tracking data of a user (e.g., user 110) viewing the content item. For example, control circuitry 511 may measure the eye gaze vector of user 110.

At step 706, based on the eye vector data, control circuitry 531 may determine whether the user 110 has looked at the object in the content item for a certain period of time. If a threshold amount of time has passed for which the user has not looked at the object (e.g., user 110 ignored or overlooked the object for at least a certain period of time, thereby demonstrating low user engagement with the object), then at step 708, control circuitry 531 may change the position the object in a subsequent saccade of the user 110. For instance, control circuitry 531 may move the object to a location within the content item that the user 110 is more likely to look at.

If the amount of time for which the user has not looked at the object is less than the first threshold (e.g., user 110 has looked at the object, hence did not ignore or overlook it), then, at step 710, control circuitry 511 may determine whether the user has sufficiently engaged with the object based on how long the user has looked it. For instance, if the user has looked at the object for less than a second threshold period of time (e.g., less than five seconds), then control circuitry 511 may determine that the length of the user's gaze indicates insufficient or low user engagement (e.g., no fixation or no pursuit of the featured object). Therefore, at step 712, control circuitry 531 may change the object in a subsequent saccade. For instance, control circuitry 531 may change one or more visual attributes of the object, or switch the object with a replacement object, without changing the location of the object. If the user has looked at the object for at least the second threshold period of time (e.g., at least five seconds), then control circuitry 511 may determine that the user has sufficiently engaged with the object. For instance, control circuitry 531 may record, in user activity history, a successful delivered impression of the featured object.

Although example process 700 describes modifying an object featured within a content item, it is understood that the example process may be implemented for modifying the content item itself or other suitable portions thereof.

FIG. 8 is a flowchart of another example process 800 for modifying displayed content based on a saccade of a user, in accordance with an embodiment of the disclosure. In some embodiments, at step 802, control circuitry 531 may cause a plurality of content items to be displayed on a display of a device. A first content item from the plurality of content items may be displayed at a first region on the screen space or field of view of the display.

At step 804, control circuitry 511 may obtain eye tracking data of the user, for example, by way of one or more sensors communicatively connected to the device.

At step 806, based on the eye tracking data, control circuitry 311 may detect the onset of a saccade of the user. If a saccade is detected, then, at step 808, control circuitry 311 predicts, based at least in part on the eye tracking data, an end location of the saccade and the duration of the saccade. In some examples, control circuitry 511 may predict the end location based on saliency of attributes (e.g., saliency score) of each content item displayed on the device, based on eye tracking data during the saccade, or both. At step 810, control circuitry 511 may identify a saccadic suppression window based at least in part on the predicted duration of the saccade.

At step 812, control circuitry 511 determines whether the predicted end location is at least a threshold distance away from the first region. If the user is looking far away enough from the content item to be modified, then they are less likely to be distracted by or notice that the modification is being performed. Thus, if the predicted end location is determined to be at least a threshold distance away from the first region, then, at step 814, control circuitry 511 may cause modification of the display of the first content item at the first region, at a time within the saccadic suppression window.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

Throughout the specification, the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

What is claimed is:

1. A computer-implemented method comprising:
   causing a plurality of content items to be displayed on a display of a device, wherein a first content item of the plurality of content items is displayed at a first region on the display of the device;
   obtaining eye tracking data of a user;
   determining, based at least in part on the eye tracking data, an onset of a saccade of the user;
   predicting an end location, on the display, of the saccade, and a duration of the saccade, wherein the predicting the end location is performed at a time prior to the onset of the saccade and prior to obtaining the eye tracking data, and the predicting the end location comprises:
      calculating a respective saliency score for each of the plurality of content items, wherein the plurality of content items correspond to a plurality of respective regions on the display of the device;
      determining that the first content item of the plurality of content items has the highest saliency score; and
      determining as the predicted end location a location within the first region corresponding to the first content item;
   identifying a saccadic suppression window based at least in part on the predicted duration of the saccade; and
   based at least in part on the predicted end location, causing modification of the display of the first content item at a time that is within the saccadic suppression window.

2. The computer-implemented method of claim 1, wherein the modification of the display of the first content item comprises causing the first content item at the first region of the display to be replaced with a second content item.

3. The computer-implemented method of claim 2, further comprising:
   selecting the second content item based at least in part on at least one of: visual or semantic features of the first content item, visual or semantic features of the second content item, or visual or semantic features of another content item from the plurality of content items that remains unmodified.

4. The computer-implemented method of claim 2, further comprising selecting the second content item based at least in part on the predicted duration of the saccade.

5. The computer-implemented method of claim 2, wherein a third content item of the plurality of content items displayed at a second region on the display of the device remains unmodified when the first content item is replaced with the second content item at the first region of the display.

6. The computer-implemented method of claim 1, wherein the modification of the display of the first content item comprises at least one of: changing a background of the first content item; changing text of the first content item; replacing a visual component within the first content item with another visual component; changing an arrangement of the visual component within the first content item; or changing a visual feature of the visual component within the first content item.

7. The computer-implemented method of claim 1, wherein the modification of the display of the first content item comprises at least one of: a gradual modification of the display of the first content item over a period of time; an abrupt modification of the display of the first content item; or a modification of the display of the first content item over a duration of a plurality of saccades.

8. The computer-implemented method of claim 1, wherein predicting the end location is further based at least in part on the eye tracking data.

9. The computer-implemented method of claim 1, wherein calculating, for each of the plurality of content items, the respective saliency score is based at least in part on at least one of a visual saliency score or a semantic saliency score of the corresponding content item.

10. The computer-implemented method of claim 1, wherein a content item from the plurality of content items comprises a background of a region.

11. A computer-implemented method comprising:
   causing a plurality of content items to be displayed on a display of a device, wherein a first content item of the plurality of content items is displayed at a first region on the display of the device;
   obtaining eye tracking data of a user;
   determining, based at least in part on the eye tracking data, an onset of a saccade of the user;
   predicting an end location, on the display, of the saccade, and a duration of the saccade, wherein the predicting the duration of the saccade comprises:
      determining an amount of time remaining in the saccade, based at least in part on a peak velocity of the saccade; and
      determining a distance remaining in the saccade, based at least in part on a distance between a current location of the saccade and the predicted end location of the saccade;
   identifying a saccadic suppression window based at least in part on the predicted duration of the saccade; and
   based at least in part on the predicted end location, causing modification of the display of the first content item at a time that is within the saccadic suppression window.

12. The computer-implemented method of claim 1, wherein the causing the modification of the display is further based at least in part on:
   determining a user engagement level in relation to the first content item; and
   determining that the user engagement level in relation to the first content item is below a threshold level of user engagement.

13. The computer-implemented method of claim 12, wherein the user engagement level is based at least in part on at least one: a length of time that user gaze is directed at the first content item; a number of times a user gaze is directed at the first content item; or a number of saccades of the user within a certain distance of the first region.

14. The computer-implemented method of claim 1, wherein the causing the modification of the display is further based at least in part on:
   determining a user engagement level in relation to the first content item; and determining that the user engagement level in relation to the first content item is above a threshold level of user engagement.

15. The computer-implemented method of claim 1, wherein predicting the end location is further based at least in part on a predicted layout scanning pattern associated with the plurality of content items as displayed on the display of the device.

16. The computer-implemented method of claim 1, wherein causing modification of the display of the first content item at a time that is within the saccadic suppression window is further based at least in part on determining that the predicted end location is at least a threshold distance away from the first region.

17. The computer-implemented method of claim 1:
wherein each of the plurality of content items is associated with a respective plurality of default values corresponding to visual or semantic attributes of the respective content item; and
the method further comprising:
  calculating a saliency score of the first content item as displayed at a first time;
  determining that the saliency score of the first content item at the first time is below a threshold; and
wherein causing modification of the display of the first content item further comprises modifying one or more default values associated with the first content item based at least in part on the determining that the saliency score is below the threshold.

18. A system comprising:
input/output circuitry configured to:
  cause a plurality of content items to be displayed on a display of a device, wherein a first content item of the plurality of content items is displayed at a first region on the display of the device; and
control circuitry configured to:
  obtain eye tracking data of a user;

determine, based at least in part on the eye tracking data, an onset of a saccade of the user;
predict an end location, on the display, of the saccade, and a duration of the saccade, wherein the control circuitry is configured to predict the end location at a time prior to the onset of the saccade and prior to obtaining the eye tracking data, and wherein the control circuitry is configured to predict the end location by:
  calculate a respective saliency score for each of the plurality of content items, wherein the plurality of content items correspond to a plurality of respective regions on the display of the device;
  determining that the first content item of the plurality of content items has the highest saliency score; and
  determining as the predicted end location a location within the first region corresponding to the first content item;
identify a saccadic suppression window based at least in part on the predicted duration of the saccade; and
based at least in part on the predicted end location, causing modification of the display of the first content item at a time that is within the saccadic suppression window.

19. The system of claim 18, wherein the control circuitry is configured to perform the modification of the display of the first content item by causing the first content item at the first region of the display to be replaced with a second content item.

20. The system of claim 19, wherein the control circuitry is configured to select the second content item based at least in part on at least one of: visual or semantic features of the first content item, visual or semantic features of the second content item, or visual or semantic features of another content item from the plurality of content items that remains unmodified.

* * * * *